(12) United States Patent
Holtmanns et al.

(10) Patent No.: US 7,628,322 B2
(45) Date of Patent: Dec. 8, 2009

(54) METHODS, SYSTEM AND MOBILE DEVICE CAPABLE OF ENABLING CREDIT CARD PERSONALIZATION USING A WIRELESS NETWORK

(75) Inventors: Silke Holtmanns, Vantaa (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 686 days.

(21) Appl. No.: 11/237,811

(22) Filed: Sep. 28, 2005

(65) Prior Publication Data

US 2006/0196931 A1   Sep. 7, 2006

Related U.S. Application Data

(60) Provisional application No. 60/659,258, filed on Mar. 7, 2005.

(51) Int. Cl.
*H04K 1/00* (2006.01)
(52) U.S. Cl. ...................... 235/380; 380/247
(58) Field of Classification Search ............... 235/380; 380/247; 455/411; 713/168
See application file for complete search history.

(56) References Cited

U.S. PATENT DOCUMENTS

| | | | |
|---|---|---|---|
| 5,557,679 A | 9/1996 | Julin et al. | |
| 7,023,994 B1* | 4/2006 | Dupre | 380/247 |
| 2002/0164031 A1* | 11/2002 | Piikivi | 380/270 |
| 2004/0168063 A1* | 8/2004 | Revital et al. | 713/172 |
| 2006/0265595 A1* | 11/2006 | Scottodiluzio | 713/180 |

FOREIGN PATENT DOCUMENTS

| DE | 10 2005 025 684 A1 | 8/2006 |
|---|---|---|
| EP | 1 408 669 A1 | 4/2004 |

OTHER PUBLICATIONS

3GPP TR 33.919, 3$^{rd}$ Generation Partnership Project; Technical Specification Group Services and System Aspects; 3G Security; Generic Authentication Architecture (GAA); System Description (Release 6), Technical Report, Mar. 2005, Version 6.2.0, pp. 1-13, 3$^{rd}$ Generation Partnership Project.

(Continued)

*Primary Examiner*—Daniel A Hess
(74) *Attorney, Agent, or Firm*—Alston & Bird LLP

(57) ABSTRACT

Methods of creating a secure channel over which credit card personalization data can be transmitted over the air (OTA) are provided. In particular, Generic Authentication Architecture (GAA) may be used to establish a secure communication channel between the user equipment (UE) and a personalization application server or bureau acting as a network application function (NAF) server. An user equipment, personalization application service (e.g., a NAF server), a system embodying a personalization application server and an user equipment, and a computer program product are also provided for creating a secure channel, such as via GAA, over which credit card personalization data can be transmitted OTA.

47 Claims, 14 Drawing Sheets

OTHER PUBLICATIONS

Niemi et al., Network Working Group Request for Comment: 3310, Hypertext Transfer Protocol (HTTP) Digest Authentication Using Authentication and Key Agreement (AKA), Technical Specification, Retrieved Aug. 4, 2005 from Internet Site ftp://ftp.rfc-editor.org/in-notes/rfc3310.txt, pp. 1-17.

3GPP TS 33.220, $3^{rd}$ Generation Partnership Project; Technical Specification Group Services and System Aspects; Generic Authentication Architecture (GAA); Generic Bootstrapping Architecture (Release 7), Technical Specification, Jun. 2005, Version 7.0.0, pp. 1-41, $3^{rd}$ Generation Partnership Project.

Calhoun et al., Network Working Group Request for Comment: 3588, Diameter Base Protocol, Technical Specification, Retrieved Aug. 4, 2005 from Internet Site http://www.ietf.org/rfc/rfc3588.txt, pp. 1-138.

Global Platform, Card Specification, Technical Specification, Mar. 2003, pp. 1-237, Version 2.1.1, Global Platform, Inc., USA.

International Search Report for PCT/IB2006/000412 dated Aug. 29, 2006.

* cited by examiner

Mobile payment

Click on Accept to accept the usage of the card for a mobile payment
Mobile payment is available to subscriptions of DNA, Elisa, Sonera

Adopting the service

Card           Visa
Card number    4920 1900 1234 5678
Expiry date    05/05
Phone number   [           ]
Online use     [ ] I want to use this card for Mobile Payment with the phone indicated above <u>Card terms</u>
<u>Terms and conditions for mobile payment</u>
<u>Further information on mobile payment</u>
<u>Return without accepting</u>

< Accept >

FIG. 12

The card information has now been sent to the phone +358 123456789
The following code needs to be entered to your phone to activate the mobile payment.
Personalization code    8517

< Close >

FIG. 13

METHODS, SYSTEM AND MOBILE DEVICE CAPABLE OF ENABLING CREDIT CARD PERSONALIZATION USING A WIRELESS NETWORK

CROSS REFERENCE TO RELATED APPLICATION(S)

The present application claims priority from U.S. Provisional Application No. 60/659,258, filed Mar. 7, 2005 entitled Methods, System and Mobile Device Capable of Enabling Credit Card Personalization Using a Wireless Network, the contents of which are incorporated herein in their entirety.

FIELD OF THE INVENTION

This invention relates to enabling a mobile terminal for credit card personalization, and more particularly to enabling a mobile terminal for credit card personalization using a wireless network.

BACKGROUND OF THE INVENTION

Credit card companies, such as MasterCard and Visa, are currently successfully using an EMV (Europay, MasterCard, and Visa) credit card payment standard to perform credit card personalization. Credit card personalization refers to the process by which security and user data is transmitted to a user's credit card, such as a smart card containing an EMV chip. A first step in this personalization process is establishing an issuer security domain, which today is typically done in the factory of a smart card manufacturer. The security domain is used to create a secure channel between a personalization device, which is used to conduct the download of application data and the actual personalization, and the EMV chip embedded in the credit card. A secure channel is any channel over which information can be transmitted without being readily publicly available, and may be created, for example, using various encryption schemes or by authenticating both end points of the channel. Once the secure channel is created, the personalization device can activate the EMV chip and eventually transmit the personalization data to it. Credit card companies often rely on smart card manufacturers, such as Orga, Axalto, Giesecke and Devrient, or Cedex, to perform this personalization process. These manufacturers receive the needed user personalization data from the credit card companies and perform the steps discussed below in order to embed user-specific data into each credit card. The smart card manufacturers can then act as credit card issuers on behalf of the credit card companies.

FIG. 1 is a flow chart illustrating the steps which may be taken, for example by a smart card manufacturer, when performing credit card personalization today. In step 101, the personalization device activates the EMV chip by sending it a reset command. The EMV chip responds, in step 102, by sending an Answer to Reset (ATR) to the personalization device. The application that has to be personalized, for instance a specific credit card application which has been preloaded onto the card, is then selected using a select command, in step 103. In step 104, the EMV chip returns the necessary file control information, such as file data structure information, and in step 105 an initialize update command provides the EMV chip with a personalization device random number. This random number is used as part of a cryptogram creation to establish a secure channel.

The chip responds, in step 106, by sending a sequence counter (for session key derivation), a challenge (to be used as part of the cryptogram creation), a card cryptogram (to be used to authenticate the chip), the identifier and version of the session DES (data encryption standard) master key, derivation data for encryption, decryption and message authentication code (MAC) DES (Data Encryption Standard) keys, and a source channel protocol identifier.

In step 107, the personalization device authenticates itself to the EMV chip by providing a cryptogram in the external authentication command. The EMV chip then confirms the external authentication, in step 108, and then, in step 109, the personalization device starts shipping the data to the EMV chip by issuing one of several store data commands and eventually the special last store data. Finally, in step 110, the data storage is confirmed.

Recently, companies such as MasterCard and Visa have introduced a new payment method known, for example, as PayPass or Visa Waver, wherein credit cards are manufactured having RFID (radio frequency identification) capabilities. Under this new method, merchants are equipped with RFID devices that are capable of reading these RFID-capable credit cards when a user places his or her card a few centimeters in front of the reader. This new method enables faster and easier credit card payments. Similar proximity RFID systems are also being used in public transportation systems, such as Octopus or Helsinki Public Transport. For example, prepaid bus, or train, cards containing RFID capabilities may be purchased by customers and used in conjunction with RFID readers at the bus or train station to purchase tickets for riding the bus or train.

The use of RFID readers at different vendor locations, as well as at various public transportation stations, opens the door to other types of payment methods that could utilize these point-of-sale (POS)RFID readers. One such payment method would be to enable an individual to use his or her mobile phone, or some other mobile device, such as a personal digital assistant (PDA) or mobile personal computer (PC) that is connected to a mobile phone or PDA (e.g., via Bluetooth, cable, RFID, or Infrared), to transfer credit card or other user-specific information. In other words, the individual could use his or her mobile phone in the same circumstances as he or she would use his or her credit card or prepaid public transportation card. For example, the user's personal credit card details could be embedded in the mobile device and transmitted to the POS RFID reader. The same protocols used, for example, for PayPass and VisaWave could be used. In this case, the mobile device would be connected to a PC; the PC would request the necessary data from the mobile device, and then transfer the data to the POS (via the Internet).

In order to implement this mobile EMV system, the overall system must first be certified. EMV certification is an expensive procedure defined by EMV that every smart card issuer that wishes to act as an EMV issuer must comply with. Without certification, it is unlikely that credit card companies will accept the inherent risks involved and "connect" the mobile EMV solution to their payment infrastructure. Mobile devices, however, are much more open than smart cards, since they can run additional software applications and have more external interfaces than a smart card. As a result, mobile EMV software applications built on existing mobile device hardware would likely face serious challenges when attempting to obtain EMV certification; thus making obtaining the requisite certification very difficult and expensive.

One alternative solution is to integrate an already certified EMV chip or smart card into the mobile device, rather than building mobile EMV software applications on existing mobile device hardware. To do this, one option is to introduce a second slot into the mobile device, wherein the EMV chip could be personalized as usual, for example at a smart card manufacturer, and then later inserted into the mobile device by the user. However, this approach too can be very expensive due to the additional hardware costs for the mobile device for the mass-market. Other options would be to either incorporate a Universal Integrated Circuit Card (UICC) that supports many applications into the mobile device, or embed the certified EMV chip into the mobile device during manufacturing of the device.

During manufacturing, however, it is not known who will ultimately own each mobile device; thus preventing any payment data from being fully personalized during the normal manufacturing process. This is different from the credit card business of today, where the recipient of the card is known during issuance of the card. One solution is to incorporate the UICC or embed the certified EMV chip into the mobile device during manufacture and then require that the user send his or her mobile device to a smart card manufacturer or personalization bureau that can then perform the personalization, in a manner similar to that discussed above with respect to the credit cards. This, however, requires that the user relinquish his mobile device to the smart card manufacturer for some period of time. Another solution is to require that the user apply for a phone with credit card functionality in the same manner as he or she would apply for a credit card. The fully personalized mobile device having credit card capabilities would then be sent directly to the user. These options, however, would require that changes be made to the existing manufacturing process and sales channels, and they can be expensive and time consuming.

Another solution is to perform the personalization over the air (OTA) after the user has purchased his or her mobile device. However, certain risks are inherent in the transmission of security data OTA. As stated above, prior to initiating a personalization process, an issuer security domain that can be used to establish a secure channel between the personalization device and the EMV chip or UICC must be created. A need therefore exists for a secure means of transmitting credit card personalization data to a mobile device OTA—i.e., a means of creating the requisite issuer security domain and secure channel.

BRIEF SUMMARY OF THE INVENTION

Generally described, exemplary embodiments of the present invention provide an improvement over the known prior art by providing a method of creating an issuer security domain for the establishment of a secure channel over which personalization data, such as credit card personalization or public transport ticketing data, can be transmitted over the air (OTA). In particular, in exemplary embodiments Generic Authentication Architecture (GAA) may be used to establish a shared secret that can be used to create a secure communication channel between the user equipment (UE) and a personalization application server or bureau acting as a network application function (NAF) server.

In general, as used herein, user equipment refers to a mobile device (e.g., a cellular telephone, personal digital assistant (PDA), laptop, pager, etc.) incorporating functionality to charge for goods or services requested for by the user of the user equipment. For example, user equipment may refer to a mobile device having EMV functionality through either an EMV-certified chip embedded in the mobile device, or one or more EMV applications stored on a UICC or smart card associated with the mobile device. In one exemplary embodiment, the EMV application may be stored on the network operator's UICC or smart card. Alternatively, a separate, EMV-specific UICC or smart card containing the one or more EMV applications may be provided. In this embodiment, the mobile device would comprise two slots for the respective UICCs (i.e., the network operator UICC and the EMV-specific UICC), wherein the EMV-specific UICC or smart card is capable of being removed and used in conjunction with another mobile device also possessing two slots. In this way, a user is capable of using different mobile devices (e.g., the user's own, as well as his or her mother's, father's, sister's, etc.) as a credit card or public transport ticketing card simply by inserting their EMV-specific UICC or smart card into the mobile device.

User equipment capable of receiving personalization data over a secure channel, a personalization application server (e.g., a NAF server where GAA is used) capable of transmitting the personalization data over the secure channel, and a system embodying this user equipment and personalization application server, are also provided in exemplary embodiments.

According to one aspect of the invention, therefore, a method is provided for creating an issuer security domain that is capable of being used to establish a secure channel for over the air (OTA) transmission of personalization data from a personalization application server to an user equipment. In one exemplary embodiment, the method includes: (1) generating one or more shared secret keys known to the user equipment and the personalization application server; and (2) using the one or more shared secret keys to create an issuer security domain, wherein the issuer security domain is capable of being used to establish a secure channel for OTA transmission of personalization data from the personalization application server to the user equipment.

According to another aspect of the invention, a method of transmitting personalization data OTA from a first entity to a second entity in a secure manner is provided. In one exemplary embodiment, the method includes: (1) generating one or more shared secret keys known to the first and second entities using a Generic Authentication Architecture (GAA); (2) using the one or more shared secret keys to create an issuer security domain between the first and second entities; (3) establishing a secure channel between the first and second entities using the issuer security domain; and (4) transmitting the personalization data over the secure channel.

According to yet another aspect of the invention, an user equipment capable of receiving personalization data from a personalization application server over a secure channel is provided. In one exemplary embodiment, the user equipment includes a user identification module comprising at least one secret key unique to the user equipment, and a secure core in communication with the user identification module. The secret key can be used to generate one or more shared secret keys known to the personalization application server and the user equipment that can be stored on the secure core. These shared secret keys can then be used to create an issuer security domain that can, in turn, be used to establish the secure channel over which the user equipment is capable of receiving the personalization data.

According to another aspect of the invention, a mobile credit card payment system is provided. In one exemplary embodiment, the system includes a personalization application server and an user equipment in communication with the personalization application server over a secure channel for transmitting personalization data OTA from the personalization application server to the user equipment. One or more shared secret keys known to the personalization application server and to the user equipment may be used to create an issuer security domain that, in turn, is capable of being used to establish the secure channel.

According to yet another aspect of the invention, a system is provided for creating an issuer security domain that is capable of being used to establish a secure channel for OTA transmission of personalization data from a personalization application server to an user equipment. In one exemplary embodiment, the system includes: (1) means for generating one or more shared secret keys known to the user equipment and the personalization application server; and (2) means for using the one or more shared secret keys to create an issuer security domain, wherein the issuer security domain is capable of being used to establish a secure channel for OTA transmission of personalization data from the personalization application server to the user equipment.

According to yet another aspect of the invention, a computer program product is provided for creating an issuer security domain that is capable of being used to establish a secure channel for OTA transmission of personalization data from a personalization application server to an user equipment. In one exemplary embodiment, the computer program product comprises at least one computer-readable storage medium having computer-readable program code portions stored therein. The computer-readable program code portions may include: (1) a first executable portion for generating one or more shared secret keys known to the user equipment and the personalization application server; and (2) a second executable portion for using the one or more shared secret keys to create an issuer security domain, wherein the issuer security domain is capable of being used to establish a secure channel for OTA transmission of personalization data from the personalization application server to the user equipment.

According to another aspect of the invention, an user equipment capable of receiving personalization data from a personalization application server over a secure channel is provided. In one exemplary embodiment, the user equipment may include: (1) means for generating one or more shared secret keys known to the user equipment and the personalization application server; (2) means for storing the shared secret keys on the user equipment; and (3) means for using the shared secret keys to create an issuer security domain. The issuer security domain can be used to establish the secure channel over which the user equipment can receive the personalization data. In one exemplary embodiment, the shared keys may be stored in a secure environment on the user equipment.

According to yet another aspect of the invention, a personalization application server capable of transmitting personalization data over a secure channel is provided. In one exemplary embodiment the personalization application server includes a processor and a memory in communication with the processor, wherein the memory stores an application that is executable by the processor. In one exemplary embodiment, the application is capable, upon execution of receiving a request for security data and transmitting an authentication challenge in response to the request, wherein the challenge comprises a request that a shared secret key be used for authentication. The application may further be capable, upon execution, of receiving a response encrypted using the shared secret key, verifying the response, and upon verification, encrypting the security data requested using the shared secret key and transmitting the encrypted security data. The encrypted security data can then be used to create an issuer security domain capable of further being used to establish the secure channel. The application stored on the memory may further be capable, upon execution, of transmitting the personalization data over the secure channel established.

According to yet another aspect of the invention, a personalization application server capable of transmitting personalization data over a secure channel is provided. In one exemplary embodiment, the personalization application server includes: (1) means for receiving a request for security data; (2) means for transmitting an authentication challenge in response to the request, wherein the challenge comprises a request that a shared secret key be used for authentication; (3) means for receiving a response encrypted using the shared secret key; (4) means for verifying the response; (5) means for, upon verification, encrypting the security data requested using the shared secret key and transmitting the encrypted security data, wherein the encrypted security data is capable of being used to create an issuer security domain capable of being used to establish the secure channel; and (6) means for transmitting the personalization data over the secure channel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 12 and 13 illustrate exemplary web pages a user may see when selecting to enable his or her user equipment for credit card functionality according to exemplary embodiments of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In one exemplary embodiment, an issuer security domain that can be used to create a secure channel for transmitting personalization information, such as credit card personalization or public transport ticketing data, OTA to a mobile device is created. In an advantageous embodiment, this issuer security domain is established using a Generic Authentication Architecture (GAA). GAA is an authentication mechanism proposed by the third generation partnership project (3GPP) and described in the 3GPP Technical Specification 33.919, entitled *Generic Authentication Architecture (GAA); System Description* (Release 6, March 2005) (3GPP TS 33.919 v6.2.0 (2005-03)), the contents of which are incorporated herein by reference in their entirety. GAA is intended to be used as a security procedure for various applications and services for users of mobile devices, such as mobile phones, personal digital assistants (PDAs), or mobile PCs (personal computers), or the like.

GAA and General Bootstrapping Procedures:

GAA is based on shared secret keys that are stored on specific secure storage entities provided in association with the user equipment (UE), as well as in subscriber databases in a mobile operator network. The secure storage entity of the UE may be provided by an appropriate security module or identification module, such as a Subscriber Identity Module (SIM) or a Universal Integrated Circuit Card (UICC) containing a SIM-like application, for example Universal SIM (USIM). The subscriber database may be provided by a network entity such as a Home Location Register (HLR) or Home Subscriber Server (HSS). The secure user identity storage entities and the subscriber database entities are typically controlled by mobile network operators who issue the user identities and who typically run and own the subscriber databases. An operator may, for example, in an application of GAA relating to mobile devices, be the mobile device user's service provider (e.g., T-Mobile or Sprint). Under GAA, the HSS or HRL and the secure storage entity of the UE have a common shared secret that is given to the HSS/HRL and secure storage entity by the mobile network operator, and is used for authenticating the user and the mobile network. This operator-owned shared secret is then used by GAA to derive new application-specific shared keys.

Figure 1:
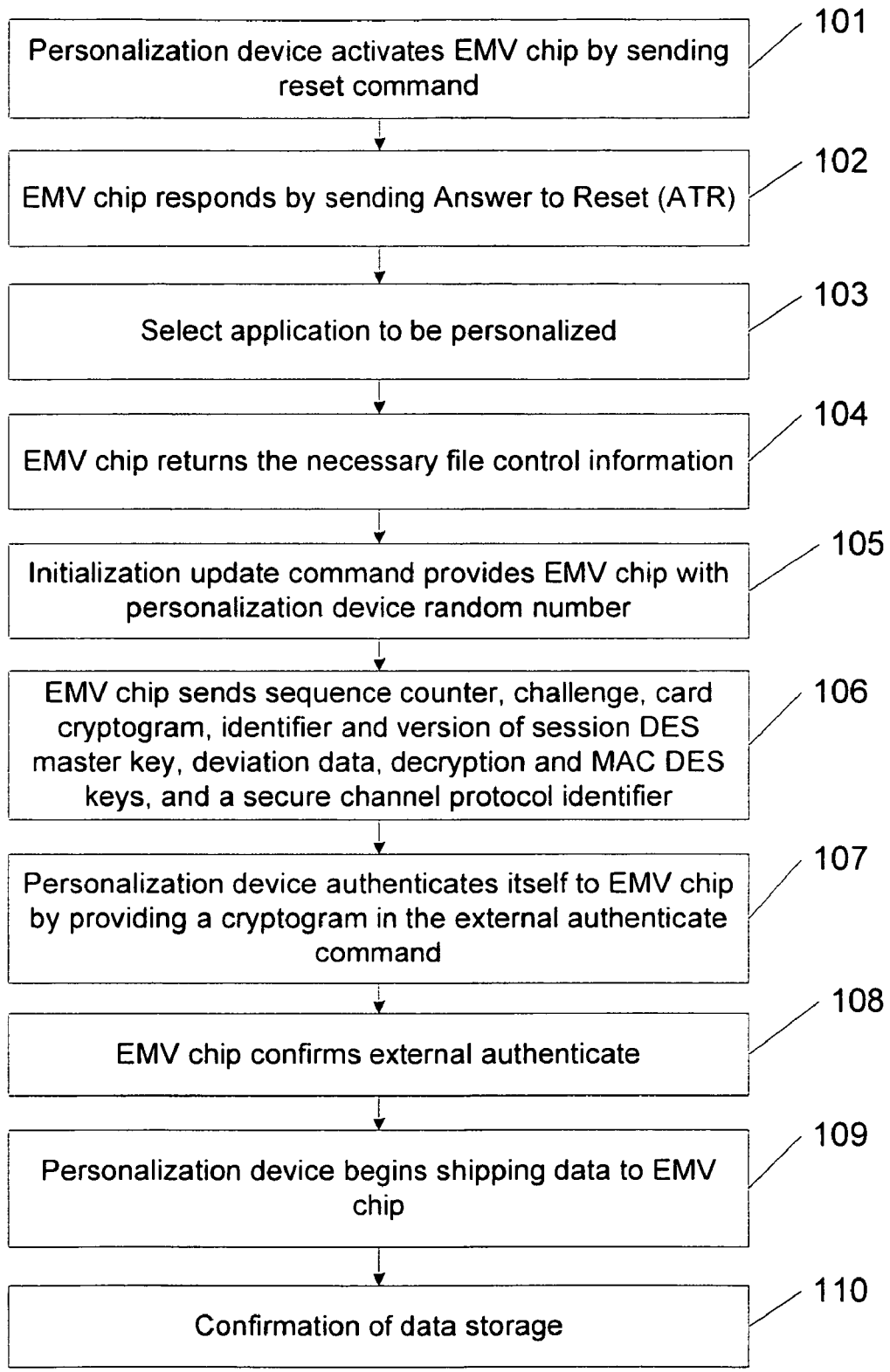
FIG. 1 is a flow chart illustrating prior art steps of performing a personalization of a credit card.
Figure 2:
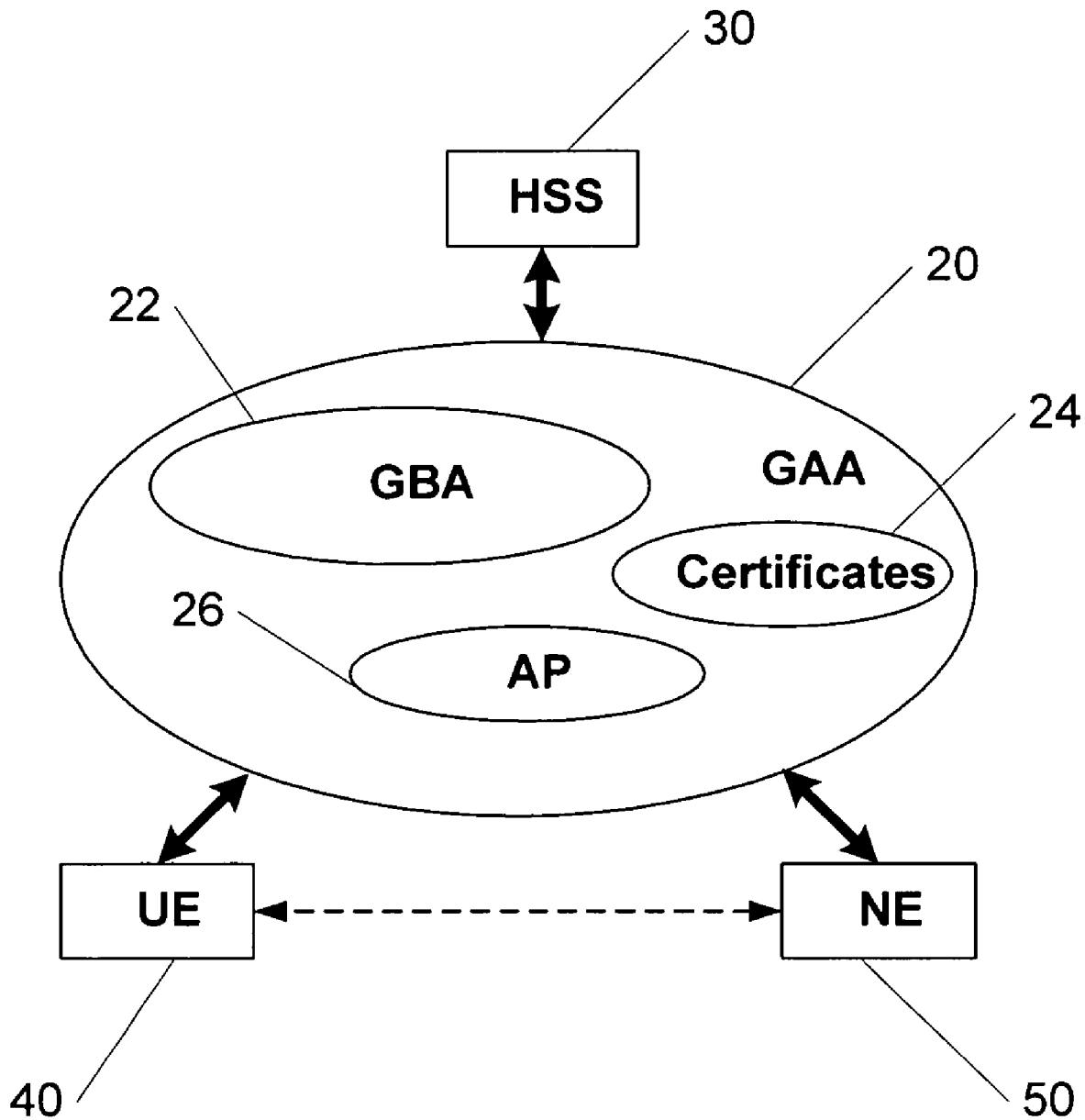
FIG. 2 illustrates an overview of a generic authentication architecture environment according to the prior art.

FIG. 2 is an overview of a GAA environment 20 in interrelation with the Home Subscriber Server (HSS) 30, the User Equipment (UE) 40, and a Network Entity (NE) 50. GAA 20 basically consists of a Generic Bootstrapping Architecture (GBA) 22, subscriber certificates 24, and an Authentication Proxy (AP) 26. An exemplary use of GAA 20 would be to provide credentials (e.g., shared secrets) to a mobile device and an application server that can subsequently be used for HTTPS (Secure Hypertext Transport Protocol). The GBA 22 builds a basis for both the subscriber certificates 24 and the AP 26 by offering generic authentication capability for various applications based on a shared secret. GBA functionality is typically to bootstrap authentication and key agreement for application security, and it is typically based on the HTTP Digest AKA (Authentication and Key Agreement) mechanism in accordance with Internet Engineering Task Force (IETF), Network Working Group, Request for Comment: 3310, entitled *Hypertext Transfer Protocol (HTTP) Digest Authentication Using Authentication and Key Agreement (AKA)*, by Niemi et al. (September, 2002), the contents of which are incorporated herein by reference in their entirety.

Figure 3:
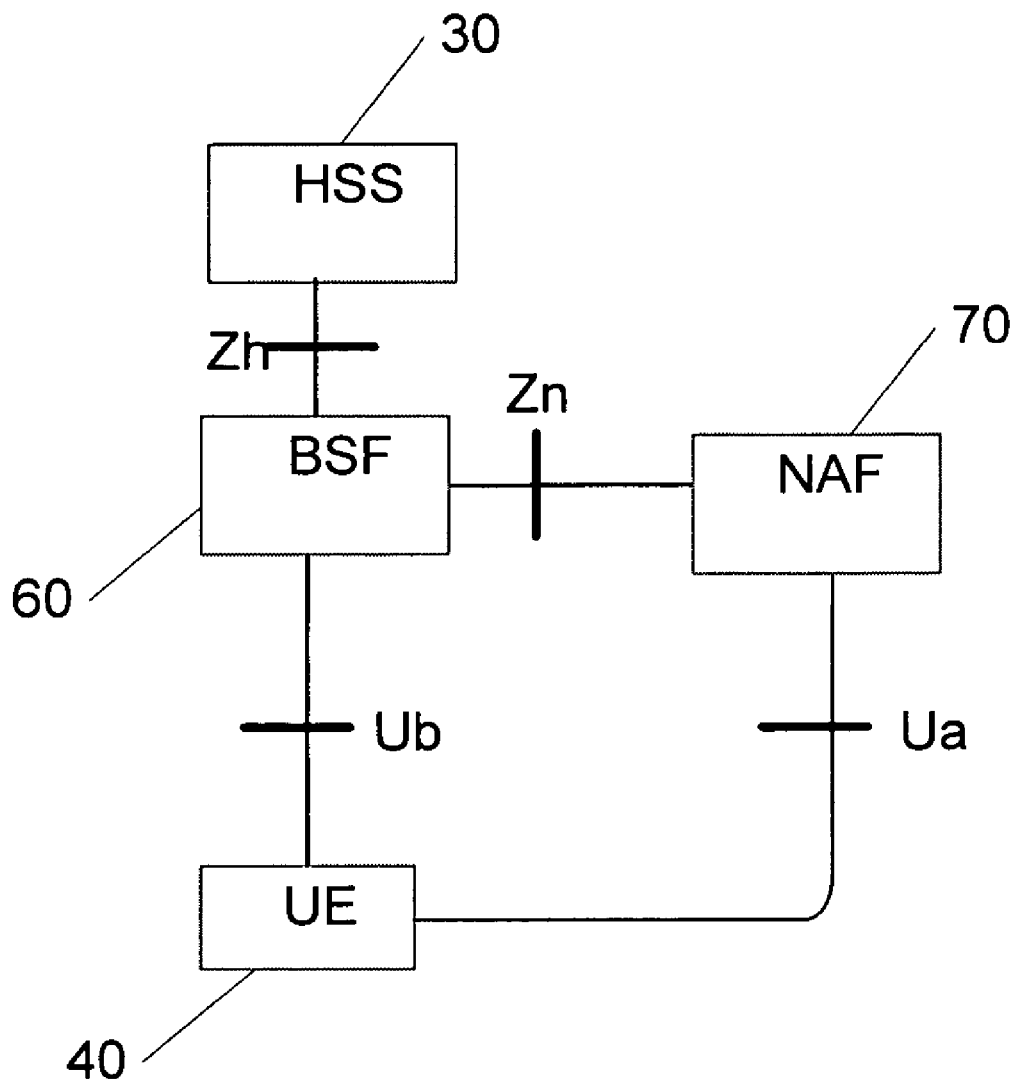
FIG. 3 illustrates a network model for the generic bootstrapping according to the prior art.

FIG. 3 illustrates an exemplary network model for generic bootstrapping. As shown, a Bootstrapping Server Function (BSF) 60 is connected via a bidirectional link to the User Equipment (UE) 40. The BSF 60 and UE 40 can mutually authenticate using the AKA protocol and agree on session keys. These session keys can later be used for a session between the user equipment and a Network Application Function (NAF) server 70, which is also connected to the user equipment 40 and to the BSF 60 by means of a bidirectional link. In one exemplary embodiment the NAF server 70 is included in the operator's system. Alternatively, the NAF server 70 may merely be under a contract with the operator for the provision of security credential services. In the case of a third-party network, the architecture may also include a Diameter-Proxy (D-Proxy), not shown, as described in the 3GPP Technical Specification 33.220, entitled *Generic Authentication Architecture (GAA); Generic Bootstrapping Architecture* (Release 7, June 2005) (3GPP TS 33.220 v7.0.0 (2005-06)) (hereinafter "TS 33.220"), the contents of which are incorporated herein by reference in their entirety and which can be found at www.3gpp.org.

After the bootstrapping procedure, which is described in detail below, the user equipment 40 and the NAF 70 can run an application-specific protocol, for instance a credit card personalization or public transport ticketing application, where the authentication and confidentiality of the messages will be based on the session keys generated during mutual authentication. Accordingly, GAA/GBA 22 can, in general, be regarded as a 3-party authentication scenario, wherein the BSF 60 is further connected to a HSS 30 or HLR, which stores, for example, GBA user security settings (GUSS). In the case where there are several HSS, the connection between BSF and HSS may utilize a SLF (Server Location Function), so that the BSF is able to find the HSS, which stores the appropriate user data.

The reference points (interfaces) between the individual entities in FIG. 3 are denoted by Ub, Ua, Zn, and Zh. In one embodiment, the interfaces Zn and Zh are based on Diameter (according to the Diameter Base Protocol, which is specified in the IETF, Network Working Group, Request For Comment: 3588, entitled *Diameter Base Protocol*, by Calhoun et al. (September 2003), the contents of which are incorporated herein by reference in their entirety). Alternatively, interface Zn could be based on the Hypertext Transfer Protocol (HTTP). Interface Ub is based on a reuse of HTTP Digest AKA messages or a variation of the HTTP Digest messages, and the protocol used by interface Ua depends on the application to be executed. In the case of a visiting NAF, an additional Zn reference point would be inserted.

Figure 4:
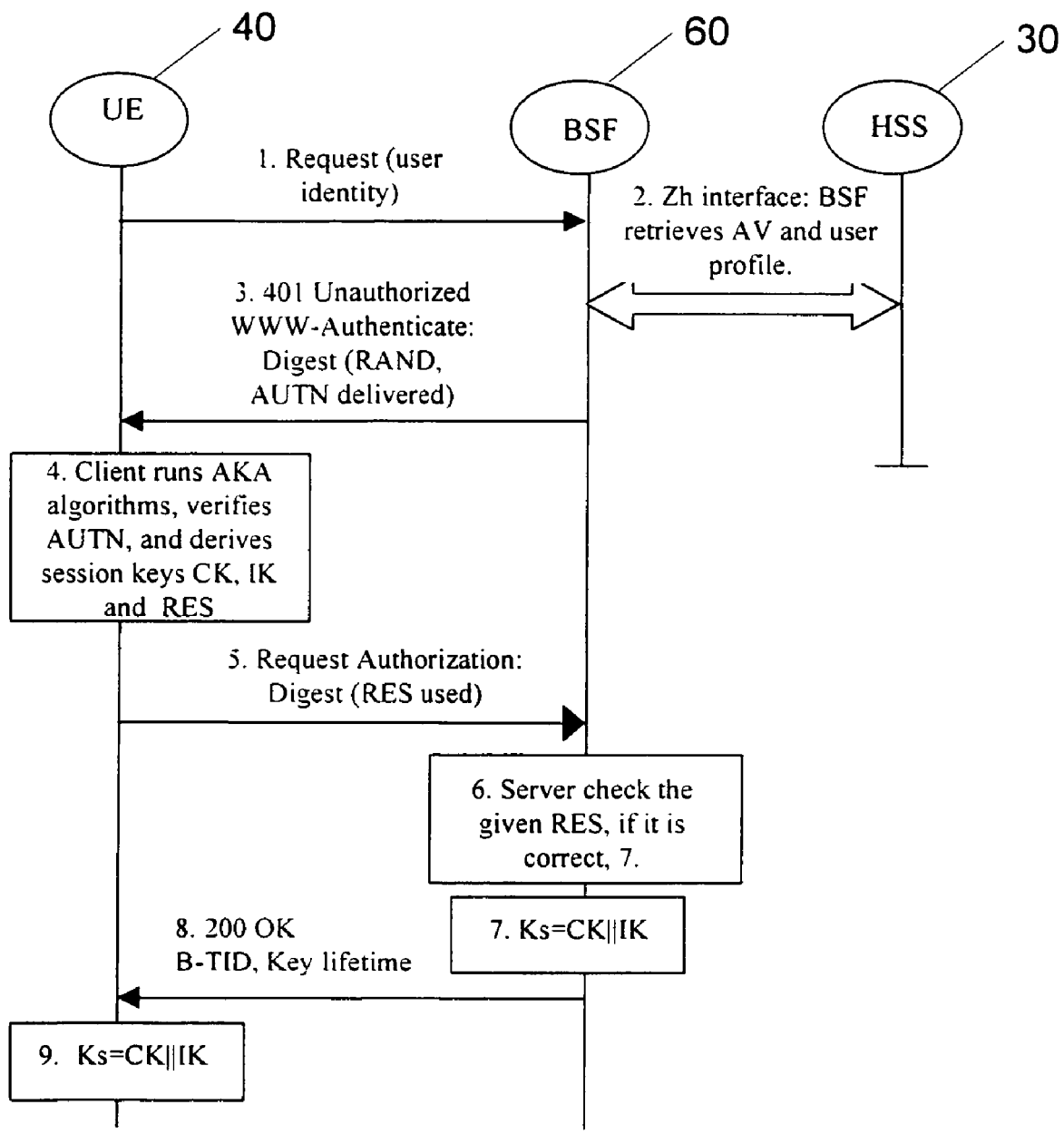
FIG. 4 illustrates a generic bootstrapping procedure according to the prior art.

The utilization of the generic bootstrapping architecture can be divided into two phases. FIG. 4 illustrates the first phase, i.e., the (generic) bootstrapping procedure as such, while FIG. 5 illustrates the second phase, i.e., the generic bootstrapping usage procedure.

As illustrated in FIG. 4, in the first step of the bootstrapping procedure, the user equipment (UE) 40 sends an HTTP request to the BSF 60. In step 2, the BSF 60 retrieves the user profile (Prof) and an authentication vector (AV), which contains five elements: random data (RAND), authentication token (AUTN), expected response (XRES), integrity key (IK), and confidentiality key (CK), over the Zh interface from the HSS 30. The BSF 60 may also retrieve the GBA User Security Settings (GUSS). Then, in step 3, the BSF 60 forwards authentication parameters RAND and AUTN to the UE 40 in order to demand that the UE 40 authenticate itself. The UE 40 calculates, in step 4, a message authentication code (MAC) so as to verify the challenge from the authenticated network, and derives session keys CK, IK, and the response RES. These session keys CK, IK, and response RES are available to both the BSF 60 and the UE 40. In step 5, the UE 40 again sends a request to the BSF 60, this time using the response RES as a password in HTTP Digest. The BSF 60 checks, in step 6, whether the received parameter is calculated using RES and is equal to the parameter that is similarly calculated using XRES, which has been obtained before as a part of the authentication vector from the HSS 30. If these parameters are equal, the UE 40 is authenticated, and the BSF 60 generates a key ("master key") Ks by concatenating the session keys CK and IK in step 7.

In step 8, the BSF 60 sends an OK message including a bootstrapping transaction identifier B-TID, and other data (such as, for example, a lifetime of the key Ks), to the UE 40, by means of which the success of the authentication is indicated. By concatenating the session keys CK and IK, the key Ks is then also generated at the UE 40 (step 9). Therewith, a bootstrapping session between the user equipment (client) 40 and the bootstrapping server function (BSF) 60 has been started successfully.

Figure 5:
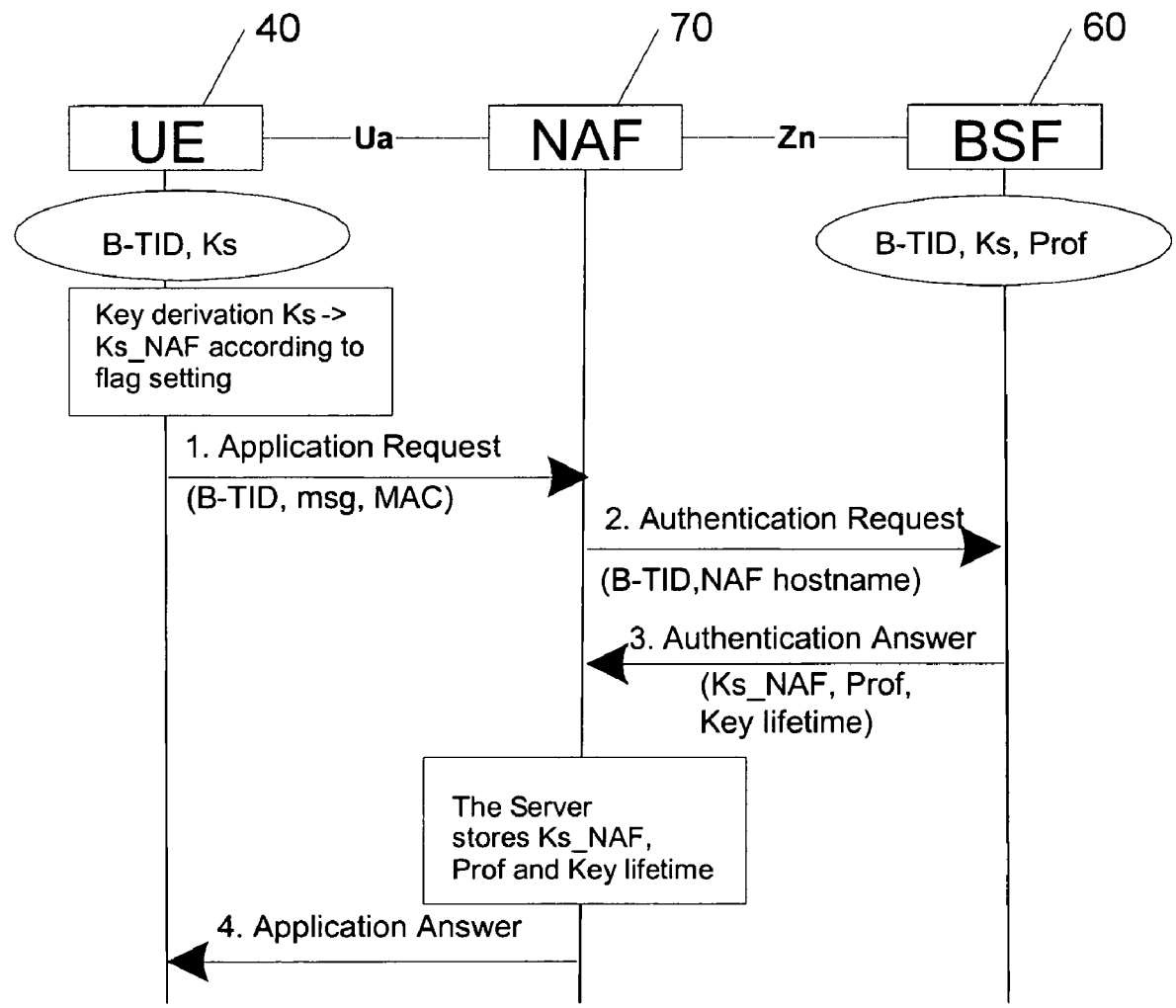
FIG. 5 illustrates a generic bootstrapping usage procedure according to the prior art.

FIG. 5 depicts an exemplary procedure using the bootstrapped security association (i.e., the second phase). After having initiated a bootstrapping session, the UE 40 can start to communicate with the NAF 70. Thereby, the master key Ks generated during the bootstrapping procedure in the UE 40 and in the BSF 60 is used to derive one or two NAF-specific keys denoted by Ks_NAF, or Ks_ext_NAF and Ks_int_NAF (depending upon whether the UE is equipped with a GBA enabled UICC, discussed below). In step 1, the UE 40 transmits an application request to the NAF 70 via the Ua interface. The application request includes the transaction identifier B-TID obtained during bootstrapping, an application-specific dataset denoted by msg, and all credentials being denoted by MAC.

In step 2, the NAF 70 requests one or more keys, and possibly user profile data corresponding to the information supplied by the UE 40, from the BSF 60 over the Zn interface. Such a request can, for example, be based on the transaction identifier. Between steps 2 and 3, the NAF-specific key(s) Ks_NAF, or Ks_ext_NAF and Ks_int_NAF is/are generated in the BSF entity 60. In step 3, the BSF 60 responds by supplying the requested key or keys (including the NAF-specific keys, bootstrapping time, key lifetime, and an application-specific part of the user profile being denoted by Prof) to the NAF 70, which the NAF 70 uses directly, or with which the NAF 70 might derive further keys required to protect the protocol used over the Ua interface towards UE 40, which is an application-specific functionality and not addressed in GAA specifications. Such derivation is performed in the same way as the UE 40 did beforehand. The NAF entity 70 then stores at least the parameters: NAF-specific keys, bootstrapping time, Prof, and the lifetime of the key. In step 4, the NAF 70 continues with the protocol used over the Ua interface by sending an application answer to the UE 40.

For further details on the generic bootstrapping architecture (GBA), reference is made to TS 33.220, referenced above.

Transmitting Personalization OTA in a Secure Manner:

Exemplary embodiments of the present invention provide a means of providing over the air (OTA) transmission of personalization data to user equipment (UE) over a secure channel. As stated above, a secure channel is any channel over which information can be transferred without being readily publicly discernible or modified, and user equipment refers to a mobile device having EMV functionality based either on an EMV-certified chip embedded in the mobile device during manufacture or one or more EMV applications stored on a UICC or smart card associated with the mobile device. In particular, exemplary embodiments involve establishing an issuer security domain that can be used to create the secure channel for the transmission of the personalization data, such as credit card personalization or public transport ticketing data, from a personalization application server to the UE. The issuer security domain may be established by various means including, for example, by one or more application programs executed by the mobile device such as an EMV application, discussed below. As a result, the user is then able to use his or her mobile device in the same manner as he or she would use a credit card or public transportation card. Exemplary embodiments further involve the generation of one or more secret keys that are shared between the UE and the personalization application server, wherein the generated shared secret keys are used to establish the secure channel. The keys may be generated by various means including, for example, by one or more application programs executed by the UE such as GBA or GBA_U along with a bootstrapping server function (BSF) server, discussed below.

As will be understood by those of ordinary skill in the art, the shared secret keys necessary for the establishment of the secure channel may be generated in various manners according to exemplary embodiments of the present invention. For exemplary purposes only, embodiments of the invention are described as using the Generic Authentication Architecture (GAA) to generate the shared secret keys, which can then be shared between the UE and a personalization application server or bureau acting as a Network Application Function (NAF) server. The use of GAA in exemplary embodiments should not, however, be taken as limiting the present invention in any way to the use of GAA.

In one exemplary embodiment of the present invention, in order to provide the OTA transmission of personalization data to the mobile device over a secure channel, a blank chip is installed into the mobile device during manufacture. A shared secret key installation process can then later be performed (i.e., an issuer security domain can be created) once the end user has possession of the mobile device, wherein shared secret keys are generated (e.g., according to the above-described GAA procedure) and then stored on the blank chip. In one exemplary embodiment, the communication interface to this blank chip may be protected. These keys can then be used by the UE (i.e., the mobile device+EMV-certified chip) to establish a secure link to the personalization application server (e.g., NAF server) for the credit card, or similar, personalization procedure.

In other exemplary embodiments, a UICC or smart card containing one or more EMV applications is associated with the mobile device. As stated above, in one exemplary embodiment the EMV applications may be stored on the network operator UICC or smart card incorporated into the mobile device during manufacturing. Alternatively, the mobile device may possess a second slot for an EMV-specific UICC or smart card that can be removed and used with any mobile device possessing two slots.

The system of exemplary embodiments, therefore, comprises means, such as hardware elements, software elements, or some combination thereof, which are embedded, for example, in the mobile device, the BSF server or the personalization application (e.g., NAF) server and are described in detail below, for generating the shared secret keys, storing the keys, and using the keys to establish an issuer security domain. Other such means not so described may further be used for carrying out these functions without straying from the spirit of exemplary embodiments of the present invention.

Figure 6:
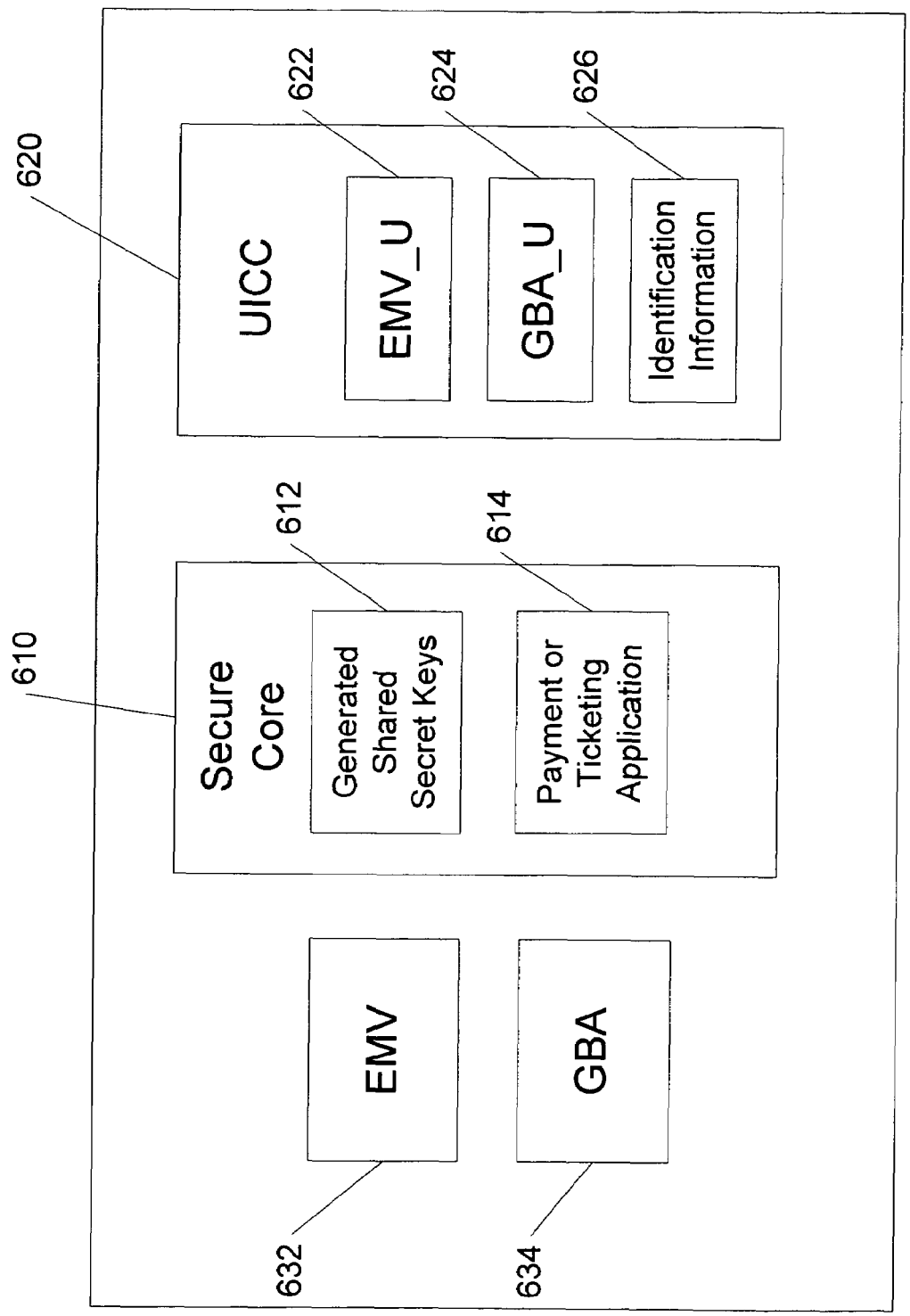
FIG. 6 is a block diagram of an user equipment capable of operating in accordance with exemplary embodiments of the present invention.

FIG. 6 is a block diagram of a UE capable of operating in accordance with exemplary embodiments of the present invention. The UE may include, for example, a mobile device, such as a cellular telephone, personal digital assistant (PDA), pager, personal computer (PC), laptop, tablet, or any other similar device, having EMV functionality, as described below. As shown, the UE may consist at least of a secure core 610, a UICC (universal integrated circuit card) 620, an EMV application 632, and a GBA application 634. The secure core 610, which need not be a central or innermost part of the mobile device, and instead merely represents any element or elements capable of functioning as described herein, may, in turn, consist of a blank chip that is installed during manufacture and is capable of storing the generated shared secret keys 612, as well as one or more payment or ticketing applications 614 installed by or on behalf of the user to facilitate usage of the UE for payment or ticketing.

The UICC 620 may contain a user identification module that stores identification information 626 specific to the user of the mobile device on which it is located. The user identification module need not actually be modular in nature. In other words, the identification information stored in the user identification module need not be stored as part of one modular entity and may, instead, be distributed throughout the mobile device. This identification information 626 may be used during the GAA procedure (or shared secret key installation process) to identify the UE to the BSF server. In one embodiment, the UICC 620 further includes EMV_U 622 and GBA_U 624 applications that are also used in the shared secret key installation process to establish the secure link between the UICC 620 and the NAF server. In particular, the GBA_U application 624 may be used to generate the NAF-specific keys, which can be used to authenticate the UE to the NAF server or to secure a communication between the two, based on the secret keys shared between the mobile network operator and the UICC 620 (i.e., CK and IK). In one embodiment, the UE may not contain a GBA_U application 624 in the UICC 620. In this instance, the key generation and storage functionality is performed by the GBA application 634 in the Ut, and the UICC would only deliver the necessary information. In one embodiment, the EMV_U application comprises a state machine that is used to monitor the progress of the shared secret key installation process. In this embodiment, if the installation process is interrupted, the state machine indicates that the installation must start again. If the UE does not contain a GBA_U application, then the EMV_U application would also reside in the mobile terminal and not in the UICC.

The EMV application 632 included in the UE serves as a communication entity by facilitating communication between entities external to the UE (e.g., the NAF and BSF servers), and the UICC 620 and secure core 610. For example, in the shared secret key installation process, the EMV application 632 is responsible for requesting the issuer security domain keys from the NAF server, handing them to the UICC 620 for decryption, and storing those keys on the secure core 610, discussed in detail below. As stated above, in one embodiment, in which there is no GBA_U application 624 in the UICC 620, the GBA application 634, which is in the UE, performs the key generation and storage function discussed below.

Figure 7A:
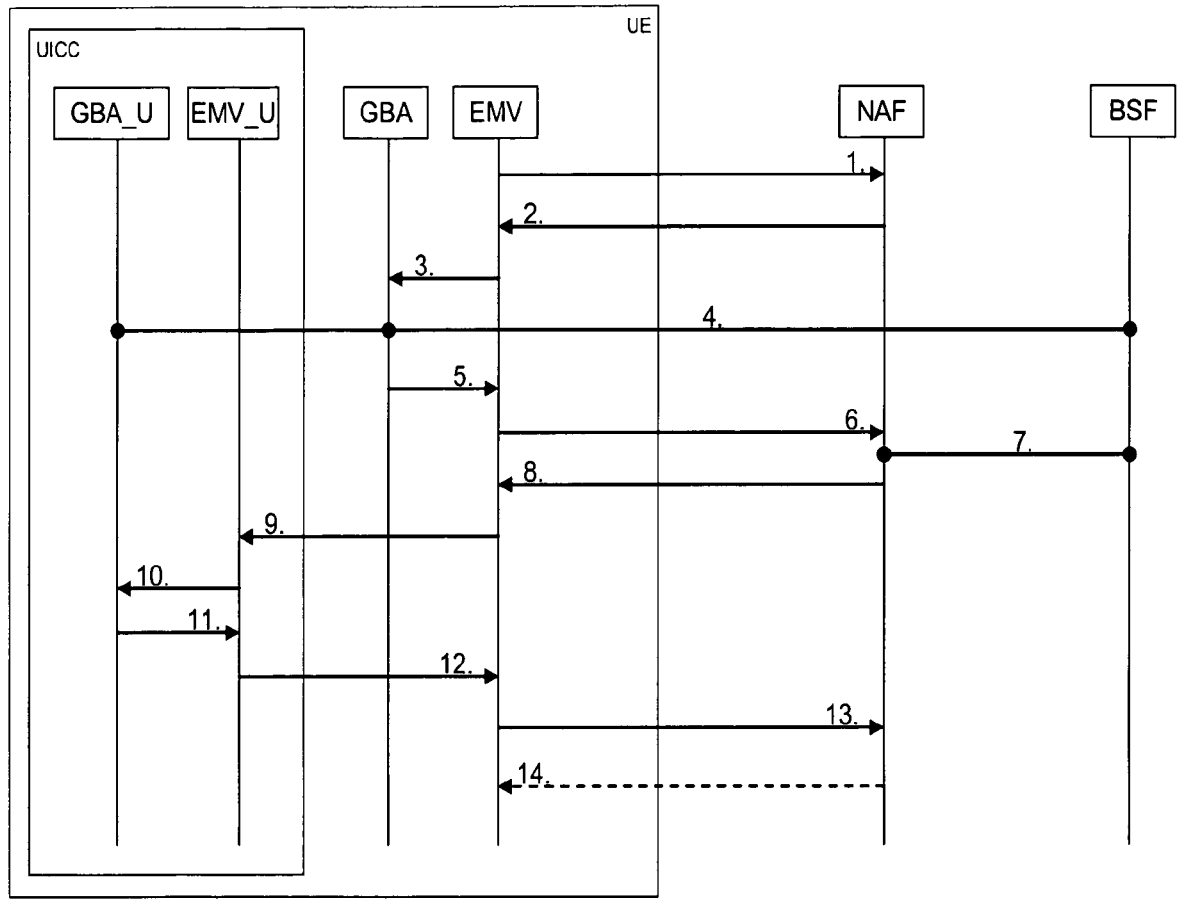
FIGS. 7A and 7B are signal flow diagrams illustrating the steps taken when preparing an user equipment for credit card personalization according to exemplary embodiments of the present invention.

FIG. 7A is a signal flow diagram illustrating the steps taken in exemplary embodiments when preparing the UE for credit card, or similar, personalization—i.e., creating an issuer security domain that can be used to establish the secure communication channel over which security and user data can be transmitted to the UE. In the first step, the EMV application (residing on the mobile/user device (UE)) requests additional security data from the NAF server (i.e., a personalization bureau either hosted by the operator or in a business relationship with the operator). The additional security data represents the issuer security domain keys that are later used for the actual personalization process and could be, for instance, an encryption key and/or a MAC (message authentication code) key. In step 2, the NAF server returns an authentication challenge to the EMV application and requests that the EMV application use a GAA shared secret method to authenticate itself. The EMV application on the UE then, in step 3, requests the GAA shared secret from the GBA application also located on the UE.

In step 4, the shared secret is established using the bootstrapping procedure discussed in detail above. The GBA application on the UE, a GBA_U application on the UICC, and the bootstrapping server function (BSF) server are each involved in this process. At the conclusion of this procedure keys are generated (Ks_ext_NAF and Ks_int_NAF, in the instance where GBA_U is supported by the UICC, or Ks_NAF, in the instance where it is not). Ks_int_NAF and/or Ks_ext_NAF are known to both the GBA_U application and the BSF. In the case where GBA_U is not used, the BSF knows Ks_NAF, and the NAF can request these keys from the BSF. The UE knows only Ks_ext_NAF and Ks_NAF. Once the shared secret is established, the GBA application gives the Ks_ext_NAF to the EMV application in the UE (or, in the instance where the GBA procedure only relies on the UE, then the UE already has the Ks_NAF), in step 5. In step 6, the EMV application returns a response to the NAF server's authentication challenge to the NAF server using Ks_ext_NAF or Ks_NAF.

In step 7, the NAF server fetches the NAF-specific keys (i.e., Ks_ext_NAF and Ks_int_NAF, or Ks_NAF) from the BSF server. The NAF server then verifies the authentication response, encrypts the additional security data, for example, using Ks_int_NAF or Ks_NAF, and transfers the encrypted data to the EMV application on the UE, in step 8. The EMV application, however, cannot decrypt the received data encrypted with Ks_int_NAF. Note, however, that if the data is encrypted with Ks_NAF, then the UE can decrypt it, and the UE will proceed with the installation of the security data in step 11. Assuming that the UE cannot decrypt the received data, in step 9 the EMV application hands the encrypted additional security data (i.e., the issuer security domain keys) to the EMV_U application on the UICC. The security operations in the UE may be performed in a secure environment or trusted platform.

In step 10, the EMV_U application gives the encrypted additional security data (i.e., the issuer security domain keys) to the GBA_U, since the EMV_U does not have the required Ks_int_NAF key to decrypt the message. The GBA_U application decrypts the data in step 11, and gives it back to the EMV_U application. Alternatively, in steps 10 and 11, the EMV_U application can request the Ks_int_NAF key from the GBA_U application. Upon receiving the Ks_int_NAF key, the EMV_U application can decrypt the data itself. This enables the EMV_U application on the UICC to then perform the installation of the additional security data and creation of the issuer security domain. The additional security data, e.g., keys, key lifetime, key creation time, and/or B-TID, is used to create an issuer security domain on the secure core. This issuer security domain can then be used to store application-specific security domains, such as payment application data, credit card personalization data, or the like.

Figure 7B:
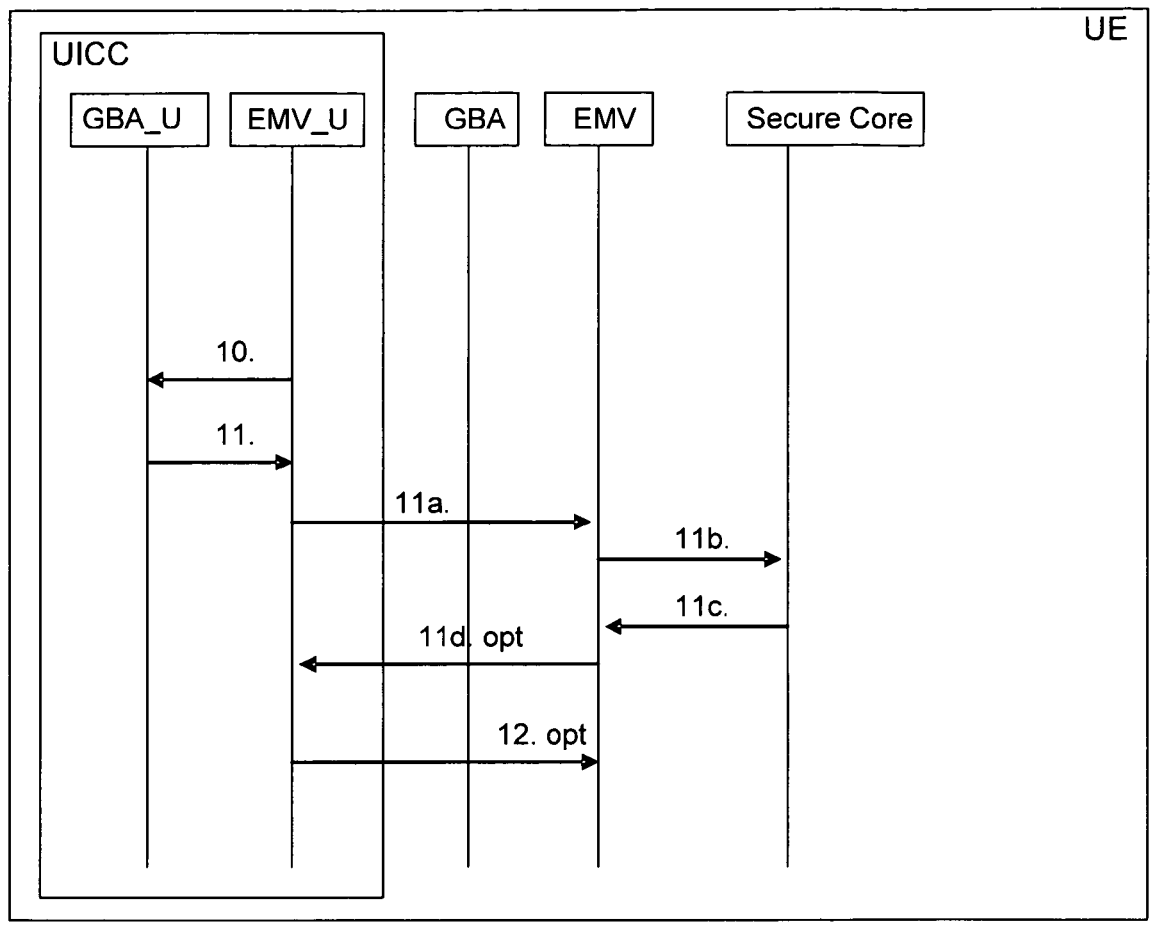

The installation process is illustrated in FIG. 7B and begins with step 11a, in which the EMV_U hands the decrypted additional security data to the EMV application in the UE. The EMV application can then, in step 11b, create the issuer security domain on the secure core using the additional security data. In step 11c confirmation of the successful creation of the issuer security domain is sent from the secure core to the EMV application in the UE. Finally, in step 11*d*, which is optional, the EMV application confirms the successful creation of the issuer security domain to the EMV_U.

In step 12, shown in FIGS. 7A and 7B, the EMV_U application optionally returns a success (or failure) message to the EMV application on the UE. The EMV application then returns this success (or failure) message to the NAF server in step 13 (not shown in FIG. 7B). In one embodiment, the success message returned by both the EMV and the EMV_U application is encrypted using an NAF-specific key in order to provide sender authenticity. Finally, in step 14, which is also optional (and not shown in FIG. 7B) the NAF server returns acknowledgement for the success message.

In certain embodiments, additional security protocols, such as Secure Channel Protocol 2 (See GlobalPlatform Card Specification Version 2.1.1, available at http://www.globalplatform.org/specificationview.asp?id=card, the contents of which are herein incorporated by reference in their entirety), TLS, Pre-Shared Key (PSK) TLS, IPSec or HTTP Digest may be used in conjunction with the GAA in certain steps of the above process. The security domain keys can be used by the Secure Channel Protocol 2 for securing the download of the personalization data. The NAF-specific keys can also be used for securing the communication channel, for example, using PSK TLS.

At the conclusion of the above steps, the shared secret is established so as to permit a secure channel to be created over which personalization data, such as credit card personalization data or public transport ticketing data, can be transmitted to the UE OTA; thus enabling the UE to serve, for example, as its user's credit card or prepaid public transport card.

Exemplary Use Case:

FIGS. 8-11 are flow charts illustrating four phases for preparing a mobile device for credit card personalization according to exemplary embodiments of the present invention. The steps of these phases are merely exemplary in nature, and are based on certain assumptions, which may or may not be the case in each situation. For example, in the illustration below, it is assumed that the mobile device user has a personal Internet Banking Account, which he or she can access from anywhere using, for example, his or her personal computer (PC). It is through this Internet Banking Account that the user requests that his or her mobile device be enabled for credit card functionality. Mobile device users not having such an Internet Banking Account, however, are not prohibited from using the present invention. These users may, for example, request the enablement via the mail or facsimile.

Figure 8:
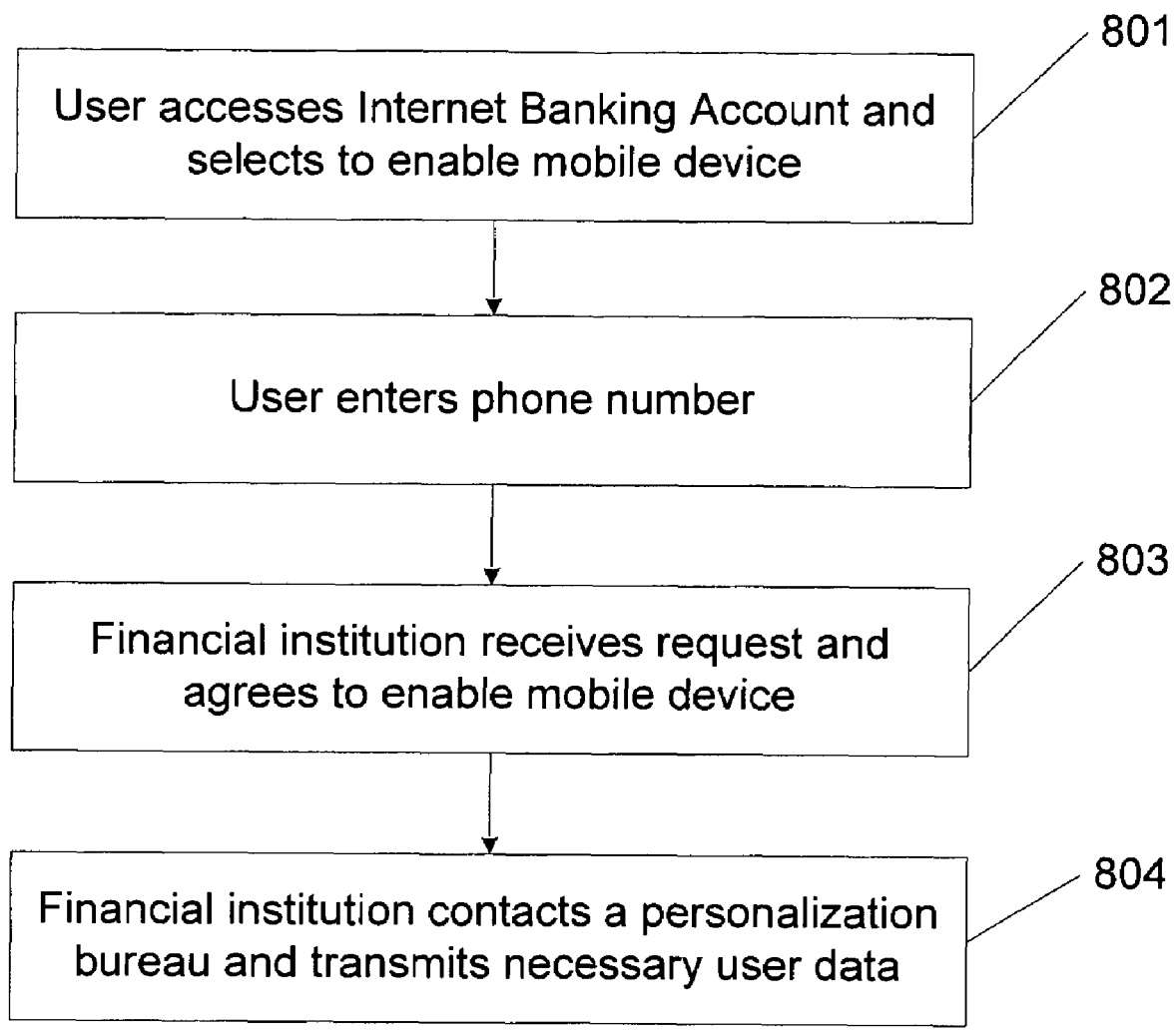
FIGS. 8-11 are flow charts illustrating four phases for preparing an user equipment for credit card personalization according to exemplary embodiments of the present invention.

In Phase 1, shown in FIG. 8, a user decides to enable his mobile device to be used as, for example, a credit card or public transport ticketing card—i.e., he begins the process of enabling the secure core/chip installed in his mobile device during manufacture. In Step 801, the user accesses his Internet Banking Account using his PC, and selects to enable his mobile device. The user is prompted to enter his phone number, which he does in Step 802. FIGS. 12 and 13 illustrate exemplary web pages a user may see when selecting to enable his or her mobile device for credit card functionality. In Step 803 the financial institution, i.e., the banking institution with which the user has an account, receives the request and agrees to enable the mobile device. Finally, in Step 804, the financial institution contacts a personalization application server or bureau (for example, acting as an NAF server in the instance where GAA is used) and transmits the necessary user data to the personalization application server. This user data may include, for example, the user's name, personalization code or PIN, phone number, etc.

Figure 9:
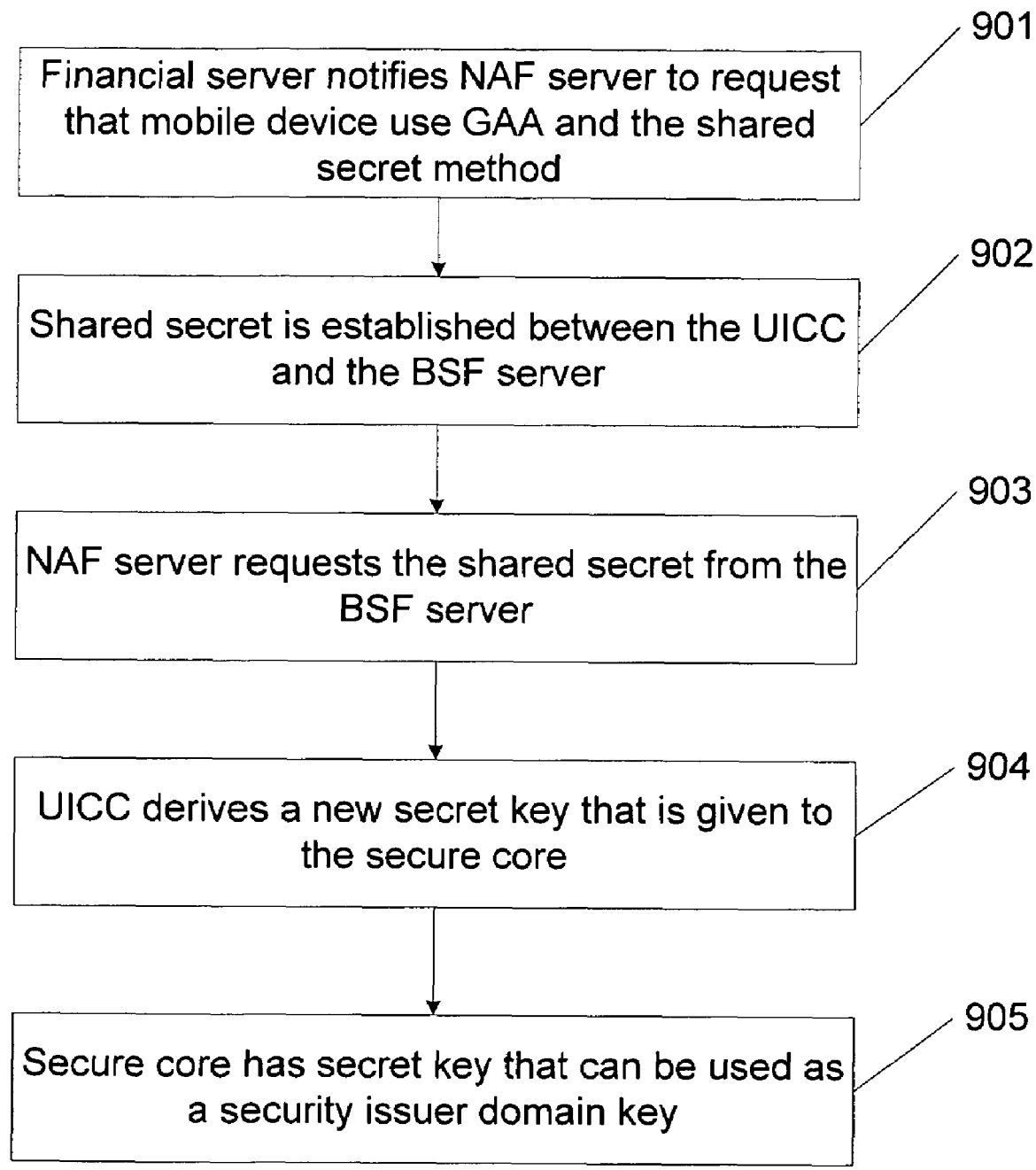

In Phase 2, shown in FIG. 9, an issuer security domain key is provided over the air (OTA) to the secure code/chip installed in the user's mobile device. In one embodiment, the secure chip is initialized during manufacturing with only a serial number. Alternatively, issuer security domain credentials may already be in place on the secure core/chip at the time of issuing. In this embodiment, Phase 2 is avoided altogether and the illustration proceeds directly to Phase 3, discussed below. Assuming, however, that the secure chip bears only the serial number, Phase 2 begins at Step 901 where the financial server notifies the NAF server to request that the mobile device use GAA and the shared secret method. This step can be done, for example, by sending WAP Push, OMA Device management means, SMS, or HTTP messages to the PC that in turn has a local connection to the phone, or by requesting that the user call a number or browse a dedicated web site.

In Step 902, the shared secret is established between the UICC on the mobile device and the BSF server, in the manner described above. The NAF server, in Step 903, then requests the shared secret from the BSF server. In Step 904, the UICC derives a new secret key that is then given to the secure core via the UE. In one embodiment, the BSF server will also derive this secret key. The secure core/chip on the user's mobile device then stores the shared secret key in Step 905. The secure core now has a secret key that can be used as a security issuer domain key.

Figure 10:
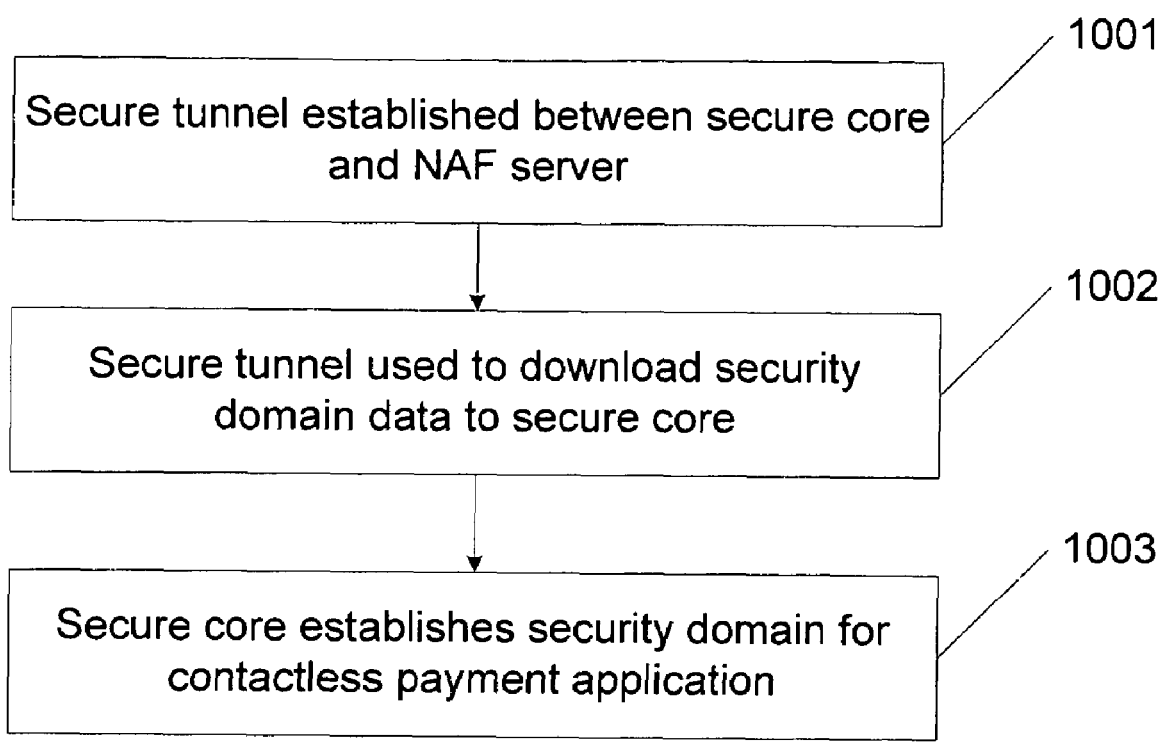

In Phase 3, illustrated in FIG. 10, a security domain is provided to the secure core of the user's mobile device for a contactless payment or ticketing application. In Step 1001, using the security issuer domain key, which was generated and stored, for example, as described in FIGS. 7A and 7B, a secure tunnel is established between the secure core and the NAF server. The mobile device supports the establishment of this tunnel using, for example, HTTP or GPRS (General Packet Radio Service). This tunnel is used, in Step 1002, to download the security domain data to the secure core. Finally, in Step 1003, the secure core establishes a security domain for the contactless payment or ticketing application.

Figure 11:
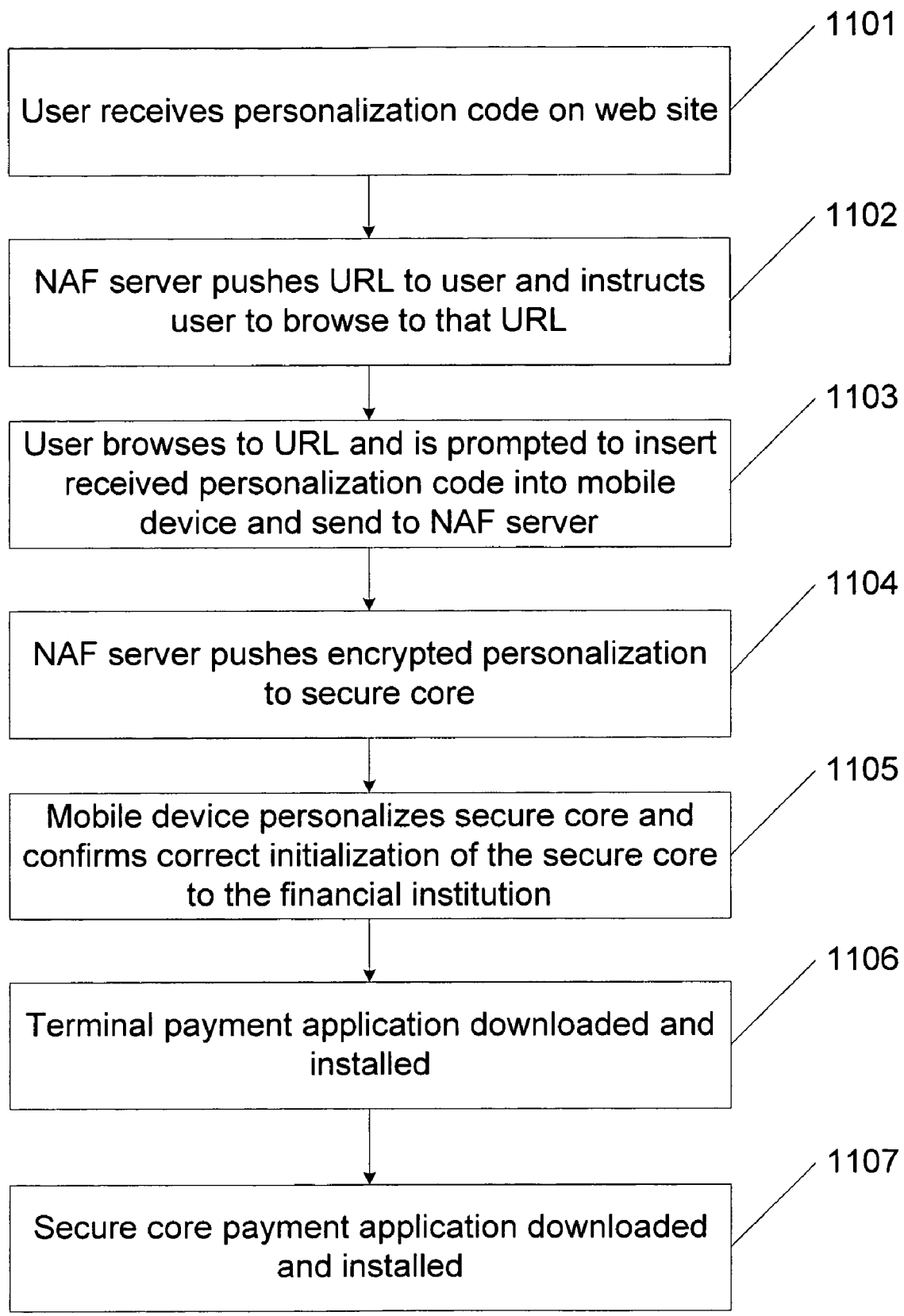
Figure 14:
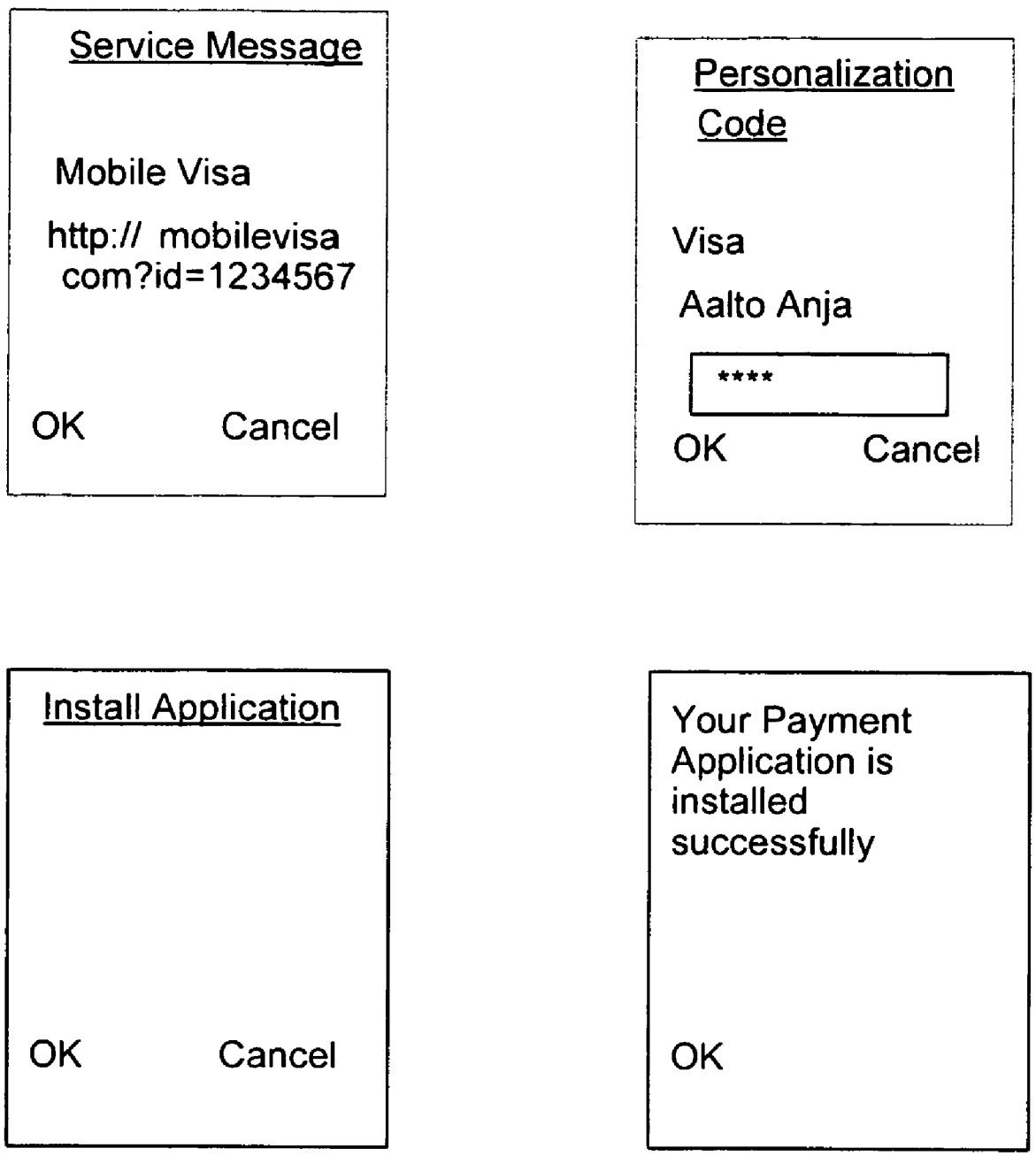
FIG. 14 illustrates exemplary screens a user may see on his or her user equipment when enabling credit card functionality according to exemplary embodiments of the present invention.

The final phase, Phase 4, illustrated in FIG. 11, represents the downloading of a payment application (e.g., mobile credit card personalization). In Step 1101, the user receives a personalization code on a web site accessed by his or her PC. The NAF server, or personalization bureau, then pushes, for example using WAP Push, a URL to the user and instructs the user to browse to that URL using his mobile device, in Step 1102. In Step 1103, the user browses to the received URL and is prompted to insert the received personalization code into his mobile device and send it to the NAF server for validation. In Step 1104, the NAF server pushes the personalization code, encrypted with the security domain keys established in Phase 2, to the secure core. In Step 1105, the mobile device personalizes the secure core (i.e., creates an application specific security domain and places personal user data, such as public transport ticket or credit card number, into that domain) and confirms the correct initialization of the secure core to the financial institution and/or to the NAF server. Finally, in Steps 1106 and 1107, respectively, a terminal payment application and a secure core payment application are downloaded and installed. FIG. 14 illustrates exemplary screens a user may see on his or her mobile device when performing the above steps. Thereafter, the user can utilize his or her mobile device to interact with a card reader, such as via RFID communications, to purchase goods or services or to pay for public transport tickets in a comparable manner to a credit or debit card.

CONCLUSION

As described above and as will be appreciated by one skilled in the art, embodiments of the present invention may be configured as a system, method, mobile device or other apparatus, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    generating one or more shared secret keys known to a user equipment and a personalization application server;
    transmitting one or more issuer security domain keys from the personalization application server to the user equipment, wherein said one or more issuer security domain keys are encrypted using the one or more shared secret keys; and
    using said one or more issuer security domain keys to create an issuer security domain, wherein said issuer security domain is configured to be used to establish a secure channel for OTA transmission of personalization data from the personalization application server to the user equipment.

2. The method of claim 1, wherein the user equipment comprises a mobile device having an EMV-certified chip embedded therein.

3. The method of claim 1, wherein the user equipment comprises a mobile device further comprising a universal integrated circuit card (UICC) having one or more EMV applications stored thereon.

4. The method of claim 3, wherein the UICC is configured to be removed from the mobile device and used in connection with another mobile device.

5. The method of claim 1, wherein the step of generating one or more shared secret keys known to said user equipment and said personalization application server is performed in accordance with a Generic Authentication Architecture (GAA), and wherein the personalization application server comprises a network application function (NAF) server.

6. The method of claim 5, further comprising:
    using a bootstrapping server function (BSF) server in communication with said NAF server and said user equipment, wherein said BSF facilitates in the generation of said one or more shared secret keys.

7. The method of claim 1 further comprising: storing said one or more shared secret keys on said user equipment.

8. The method of claim 1, wherein said personalization data comprises credit card personalization data.

9. The method of claim 1, wherein said personalization data comprises public transport ticketing data.

10. A method comprising:
    generating one or more shared secret keys known to a first and second entity using a Generic Authentication Architecture (GAA);
    transmitting one or more issuer security domain keys from said second entity to said first entity, wherein said one or more issuer security domain keys are encrypted using said one or more shared secret keys;
    using said one or more issuer security domain keys to create an issuer security domain between said first and said second entities;
    establishing a secure channel between said first and second entities using said issuer security domain; and
    transmitting personalization data over said secure channel.

11. The method of claim 10, wherein said first entity is a network application function (NAF) server, and said second entity is a user equipment.

12. The method of claim 11, further comprising:
    using a bootstrapping server function (BSF) server in communication with said NAF server and said user equipment, wherein said BSF facilitates in the generation of said one or more shared secret keys.

13. The method of claim 10, wherein the second entity comprises a mobile device having an EMV-certified chip embedded therein.

14. The method of claim 10, wherein the second entity comprises a mobile device further comprising a universal integrated circuit card (UICC) having one or more EMV applications stored thereon.

15. The method of claim 14, wherein the UICC is configured to be removed from the mobile device and used in connection with another mobile device.

16. The method of claim 10, wherein said personalization data comprises credit card personalization data.

17. The method of claim 10, wherein said personalization data comprises public transport ticketing data.

18. An apparatus comprising:
at least one processor, and
at least one memory including computer program code, the at least one memory and the computer program code configured to, with the at least one processor, cause an apparatus to perform the following:
obtain at least one secret key unique to said apparatus from a user identification module, said processor in communication with said user identification module;
store one or more shared secret keys known to a personalization application server and said apparatus, said one or more shared secret keys generated using said at least one unique secret key; and
receive one or more issuer security domain keys encrypted by said one or more shared secret keys, said one or more issuer security domain keys being used to create an issuer security domain, said issuer security domain being used to establish a secure channel over which said apparatus is configured to receive personalization data.

19. The apparatus of claim 18, wherein said one or more shared secret keys are generated in accordance with Generic Authentication Architecture (GAA), and wherein the personalization application server comprises a network application function (NAF) server.

20. The apparatus of claim 19 wherein the at least one memory and the computer program code are further configured to, with the at least one processor, cause an apparatus to:
store one or more GAA supporting applications in a computer-readable medium, said GAA supporting applications in communication with said user identification module and said processor, wherein said GAA supporting applications are configured to communicate with said NAF server and a Bootstrapping Server Function (BSF) server in order to generate said one or more shared secret keys.

21. The apparatus of claim 18, wherein said personalization data comprises credit card personalization data.

22. The apparatus of claim 18, wherein said personalization data comprises public transport ticketing data.

23. A system comprising:
a personalization application server; and
a user equipment in communication with said personalization application server over a secure channel, said secure channel used to transmit personalization data over the air (OTA) from the personalization application server to the user equipment, wherein one or more issuer security domain keys are encrypted using one or more shared secret keys known to the personalization application server and the user equipment and transmitted from the personalization application server to the user equipment, said issuer security domain keys used to create an issuer security domain that is configured to be used to establish the secure channel.

24. The system of claim 23, wherein said one or more shared secret keys are generated in accordance with a Generic Authentication Architecture (GAA), and wherein the personalization application server comprises a network application function (NAF) server.

25. The system of claim 24, further comprising:
a bootstrapping server function (BSF) server in communication with said NAF server and said user equipment, wherein said BSF facilitates in the generation of said one or more shared secret keys.

26. The system of claim 23, wherein said one or more shared secret keys are stored on said user equipment.

27. The system of claim 23, wherein the user equipment comprises a mobile device having an EMV-certified chip embedded therein.

28. The system of claim 23, wherein the user equipment comprises a mobile device further comprising a universal integrated circuit card (UICC) having one or more EMV applications stored thereon.

29. The system of claim 28, wherein the UICC is configured to be removed from the mobile device and used in connection with another mobile device.

30. A system comprising:
means for generating one or more shared secret keys known to a user equipment and a personalization application server;
means for transmitting one or more issuer security domain keys from the personalization application server to the user equipment, wherein said one or more issuer security domain keys are encrypted using the one or more shared secret keys; and
means for using said one or more issuer security domain keys to create an issuer security domain, wherein said issuer security domain is configured to be used to establish a secure channel for OTA transmission of personalization data from the personalization application server to the user equipment.

31. The system of claim 30, wherein said means for generating one or more shared secret keys known to said user equipment and said personalization application server comprises means for generating said one or more shared secret keys in accordance with a Generic Authentication Architecture (GAA), and wherein the personalization application server comprises a network application function (NAF) server.

32. The system of claim 31, further comprising:
means for using a bootstrapping server function (BSF) server in communication with said NAF server and said user equipment, wherein said BSF facilitates in the generation of said one or more shared secret keys.

33. The system of claim 30 further comprising:
means for storing said one or more shared secret keys on said user equipment.

34. A computer program product, wherein the computer program product comprises at least one computer-readable storage medium having computer-readable program code portions stored therein, the computer-readable program code portions comprising:
a first executable portion for generating one or more shared secret keys known to a user equipment and a personalization application server;
a second executable portion for transmitting one or more issuer security domain keys from the personalization application server to the user equipment, wherein said one or more issuer security domain keys are encrypted using the one or more shared secret keys; and a third executable portion for using said one or more issuer security domain keys to create an issuer security domain, wherein said issuer security domain is configured to be used to establish a secure channel for OTA transmission of personalization data from the personalization application server to the user equipment.

35. The computer program product of claim 34, wherein generating one or more shared secret keys known to said user equipment and said personalization application server comprises generating said one or more shared secret keys in accordance with a Generic Authentication Architecture (GAA), and wherein the personalization application server comprises a network application function (NAF) server.

36. The system of claim 35, further comprising:
a fourth executable portion for using a bootstrapping server function (BSF) server in communication with said NAF server and said user equipment, wherein said BSF facilitates in the generation of said one or more shared secret keys.

37. The computer program product of claim 34 further comprising:
a fourth executable portion for storing said one or more shared secret keys on said user equipment.

38. An apparatus comprising:
means for generating one or more shared secret keys known to a user equipment and a personalization application server;
means for storing said one or more shared secret keys on said user equipment;
means for transmitting one or more issuer security domain keys from the personalization application server to the user equipment, wherein said one or more issuer security domain keys are encrypted using the one or more shared secret keys; and
means for using said one or more issuer security domain keys to create an issuer security domain, wherein said issuer security domain is configured to be used to establish a secure channel over which said user equipment is configured to receive said personalization data.

39. An apparatus comprising:
at least one processor, and
at least one memory including computer program code, the at least one memory and the computer program code configured to, with the at least one processor, cause an apparatus to perform the following:
receive a request for security data;
transmit an authentication challenge in response to the request, said challenge comprising a request that a shared secret key be used for authentication;
receive a response encrypted using the shared secret key;
verify the response;
encrypt the security data requested, upon verification, using the shared secret key;
transmit the encrypted security data, wherein the encrypted security data is configured to be used to create an issuer security domain configured to be used to establish a secure channel; and
transmit personalization data over the secure channel, upon establishment.

40. The apparatus of claim 39, wherein the shared secret key is generated in accordance with a Generic Authentication Architecture (GAA), and wherein the personalization application server comprises a network application function (NAF) server.

41. The apparatus of claim 39, wherein the security data comprises one or more issuer security domain keys.

42. The apparatus of claim 41, wherein the security data further comprises a lifetime and a creation time of the one or more issuer security domain keys.

43. An apparatus comprising:
means for receiving a request for security data;
means for transmitting an authentication challenge in response to the request, said challenge comprising a request that a shared secret key be used for authentication;
means for receiving a response encrypted using the shared secret key;
means for verifying the response;
means for, upon verification, encrypting the security data requested using the shared secret key;
means for transmitting the encrypted security data, wherein the encrypted security data is configured to be used to create an issuer security domain configured to be used to establish a secure channel; and
means for transmitting personalization data over the secure channel.

44. An apparatus comprising:
at least one processor, and
at least one memory including computer program code, the at least one memory and the computer program code configured to, with the at least one processor, cause an apparatus to perform the following:
send a request for security data;
receive an authentication challenge in response to the security data request, said authentication challenge comprising a request that a shared secret key be used for authentication;
encrypt an authentication response using the shared secret key;
send the authentication response;
receive the requested security data, in response to being authenticated, said requested security data encrypted using the shared secret key;
decrypt the requested security data using the shared secret key;
create an issuer security domain using the security data;
establish a secure channel using the issuer security domain; and
receive personalization data over the secure channel.

45. The apparatus of claim 44, wherein the shared secret key is generated in accordance with a Generic Authentication Architecture (GAA).

46. The apparatus of claim 44, wherein the security data comprises one or more issuer security domain keys.

47. The apparatus of claim 46, wherein the security data further comprises a lifetime and a creation time of the one or more issuer security domain keys.

* * * * *

UNITED STATES PATENT AND TRADEMARK OFFICE
CERTIFICATE OF CORRECTION

PATENT NO. : 7,628,322 B2  Page 1 of 1
APPLICATION NO. : 11/237811
DATED : December 8, 2009
INVENTOR(S) : Holtmanns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Second Day of November, 2010

David J. Kappos
*Director of the United States Patent and Trademark Office*